United States Patent [19]

Nonnenmann et al.

[11] Patent Number: 4,519,120
[45] Date of Patent: May 28, 1985

[54] PROCESS FOR MANUFACTURING A CARTRIDGE FOR PURIFYING EXHAUST GAS

[75] Inventors: Manfred Nonnenmann, Schwieberdingen; Wolfgang Hesse, Remseck; Klaus Haller, Korntal; Helmut Bardong, Stuttgart, all of Fed. Rep. of Germany

[73] Assignee: Sueddeutsche Kuehlerfabrik Julius Fr. Behr GmbH & Co., Stuttgart, Fed. Rep. of Germany

[21] Appl. No.: 430,249

[22] Filed: Sep. 30, 1982

Related U.S. Application Data

[62] Division of Ser. No. 251,963, Apr. 7, 1981, Pat. No. 4,400,860, which is a division of Ser. No. 104,019, Dec. 17, 1979, Pat. No. 4,282,186.

[30] Foreign Application Priority Data

Dec. 23, 1978 [DE] Fed. Rep. of Germany ....... 2856030

[51] Int. Cl.$^3$ ...................... B01J 8/02; B21D 39/02
[52] U.S. Cl. ............................... 29/157 R; 29/455 R
[58] Field of Search ............... 29/157 R, 455 R, 463; 228/155, 181; 422/180, 179, 219, 127, 222, 221; 60/299, 301

[56] References Cited

U.S. PATENT DOCUMENTS

| 3,928,567 | 9/1976 | Vroman | 422/180 X |
| 3,958,312 | 5/1976 | Weaving et al. | 422/177 X |
| 4,093,423 | 6/1978 | Neumann | 29/450 X |
| 4,158,037 | 6/1979 | Aoyama | 422/180 X |

FOREIGN PATENT DOCUMENTS

| 2723532 | 11/1978 | Fed. Rep. of Germany . |
| 22272 | 7/1915 | Switzerland ............ 29/520 |

Primary Examiner—Howard N. Goldberg
Assistant Examiner—Timothy V. Eley
Attorney, Agent, or Firm—Schwartz, Jeffery, Schwaab, Mack, Blumenthal & Evans

[57] ABSTRACT

A cartridge for purifying exhaust gases from the internal combustion engine of an automotive vehicle or some other source comprising a catalyst support matrix wound of metal foil and a metal jacket housing said support matrix wherein a press fit exists between the exterior of the support matrix and the interior surface of the jacket and the support matrix and the jacket are welded or brazed together within the area of the press fit. Processes and apparatus for producing the cartridge of the invention are also disclosed.

21 Claims, 15 Drawing Figures

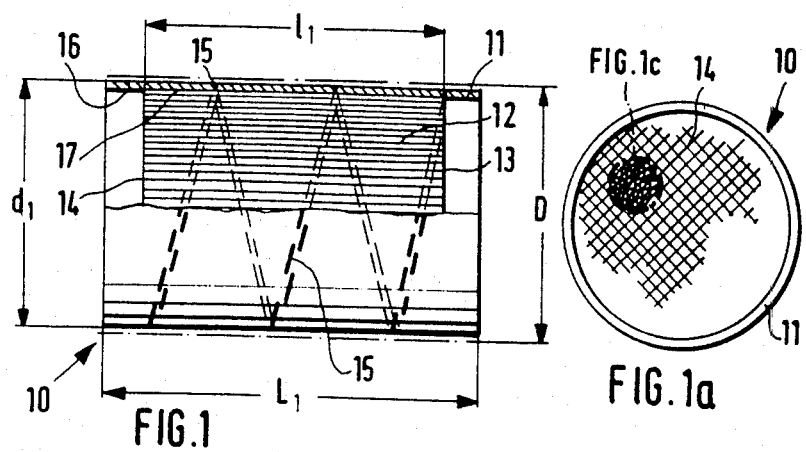
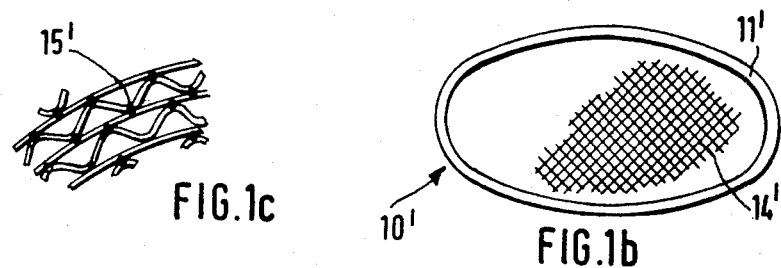
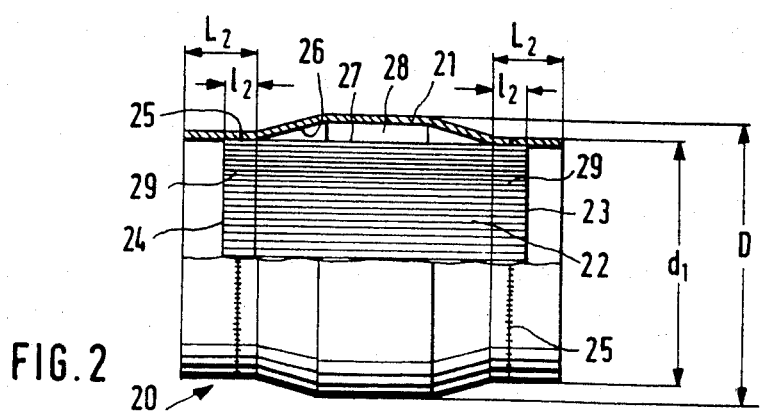

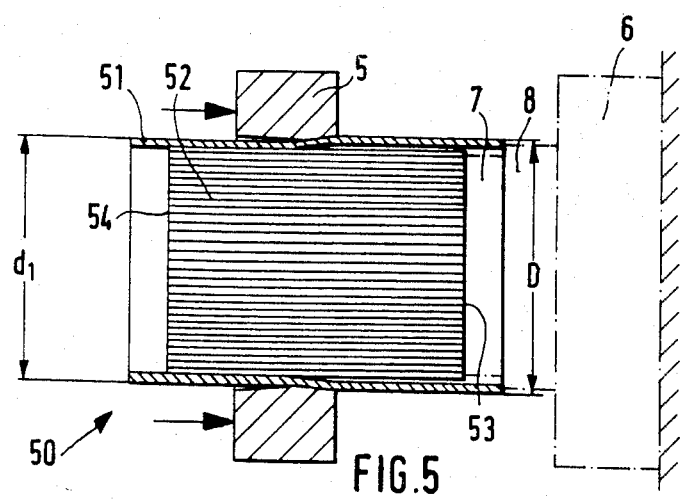
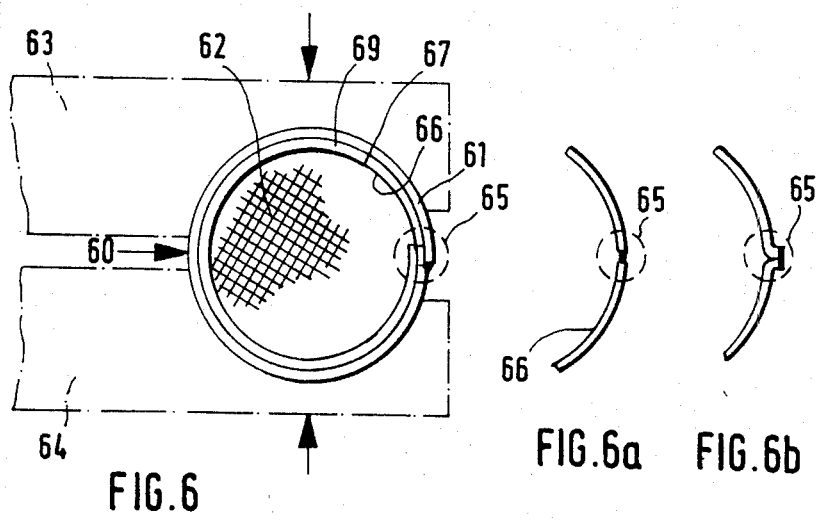

PROCESS FOR MANUFACTURING A CARTRIDGE FOR PURIFYING EXHAUST GAS

This is a division of application Ser. No. 251,963 filed Apr. 7, 1981, now U.S. Pat. No. 4,400,860 which is a division of application Ser. No. 104,019, filed Dec. 17, 1979 now U.S. Pat. No. 4,282,186.

This invention relates to a catalytic reactor cartridge for the purification of exhaust gas comprising a catalyst support matrix of wound metal foil and a metal casing or jacket housing the support matrix. More particularly, the invention relates to a cartridge useful for purifying the exhaust gases from an internal combustion engine of an automotive vehicle and similar applications.

BACKGROUND OF THE INVENTION

DE-OS No. 26 02 746 describes a supporting matrix comprising smooth and corrugated, spirally wound metal foils of high temperature resistant steel. This reference also teaches placing the supporting matrix wound under prestressing in a jacket in order to immobilize it in the axial direction. However, this fastening method has been found inadequate in view of the mechanical stresses (strong vibrations) to which the assembly is subjected.

In DE-OS No. 27 20 322, the use of electron beam welding is proposed for fastening the supporting matrix and the jacket. The weld bead, which extends helically around the circumference of the jacket, may under certain conditions weaken the mechanical strength of the jacket and cause the supporting matrix to be cut in the direction of the electron beam. Furthermore, such a design does not permit the supporting matrix to be thermally insulated with respect to the external environment.

SUMMARY OF THE INVENTION

It is, therefore, an object of the present invention first to provide a solid connection, desirably without an intervening space between the supporting matrix and the jacket, making possible satisfactory welding or brazing of the two parts and thereby axially immobilizing the supporting matrix in the jacket.

A further object of the invention is to thermally insulate the axially immobilized support matrix with respect to the external environment.

Another object of the invention is to achieve this axial immobilization of the two parts by means of a simple and economical manufacturing process.

These and other objects of the invention are achieved by providing a cartridge for purifying exhaust gases comprising a catalyst support matrix of wound metal foil and a metal jacket housing said support matrix wherein a compressive connection or press fit is formed between the outer surface of the support matrix and the inner surface of the jacket and the support matrix and jacket are secured together in the area of the press fit. The parts may be secured by welding or brazing them together within the area of the press fit. In other words, the support matrix is held in place in the jacket by compression between at least a portion of the exterior of the support matrix and an abutting portion of the jacket, and then the support matrix and jacket are further secured to each other by welding or brazing. This press fit is an essential and critical condition for subsequent satisfactory welding or brazing of the parts.

In a further aspect of the invention, the press fit extends over the entire length of the supporting matrix. Due to the use of a plurality of short weld beam segments, there is no continuous, cutting weld bead mechanically weakening the jacket or, under certain conditions, cutting through the entire matrix. Despite the absence of a continuous weld, effective axial immobilization of the supporting matrix in the jacket is achieved.

In another aspect of the invention, the press fit is extended only over two narrow strips on the surface of the supporting matrix and an annular space, preferably filled with air, is formed between the two surface strips. This intermediate space between the inner surface of the jacket and the outer surface of the supporting matrix constitutes an insulating cushion which prevents rapid outward transfer of heat from inside the supporting matrix. This insulation of the hot supporting matrix eliminates a possible fire hazard due to an overheated exhaust gas catalyst equipped with the cartridge according to the invention and located underneath an automotive vehicle a relatively short distance from the floor, which conceivably may be made of a flammable material. The jacket may be welded or brazed to the support matrix within the area of the press fit, which preferably is directly adjacent to the end faces of the support matrix.

In another aspect of the invention, the internal diameter of the jacket immediately beyond the end faces of the supporting matrix is sharply constricted to the extent that contacting surfaces are formed on the jacket for axially immobilizing the support matrix. This configuration of the jacket, which additionally may be welded in the area of the press fit which also is provided, results in a positive connection between the support matrix and the jacket.

In another aspect of the invention, the cartridge has a noval or elliptical cross section. This may be particularly advantageous when such cartridges are placed as exhaust gas catalysts under the chassis floors of automotive vehicles and, because of the catalytic reaction or for some other reason, the reactor must have a larger cross section.

In a further aspect of the invention, the end faces of the support matrix are welded or brazed. A further axial immobilization of the entire support matrix, including the inner layers thereof, is hereby ensured since a quasi rigid end face results from the welding or brazing of the individual metal foils to each other.

A further advantageous embodiment of the invention concerns a process for manufacturing the cartridge of the invention, i.e., a process which permits establishment of the requisite press fit between the support matrix and the jacket.

In one process embodiment of the invention, the support matrix may be introduced into the jacket without difficulty and subsequently joined to the jacket in a press fit of desired strength by drawing down the diameter of the jacket with a drawing tool. This drawing process is also capable of producing a plurality of different diameters and diameter transitions, with merely a suitably designed drawing tool being required therefor.

In another aspect of the invention, the press fit between the supporting matrix and the jacket is produced by means of annular grooves, which may be rolled into the previously cylindrical jacket by one or more rolls disposed around the circumference of the jacket. Subsequently, the supporting matrix is inserted into the jacket, still with some clearance between the matrix and the jacket, and the final press fit is obtained by axial compression of the jacket so that the internal diameter of the annular grooves is reduced.

In another aspect of the invention, the cartridge is manufactured not from a finished tube, but from a flat piece of sheet metal which is first rolled and then, after insertion of the supporting matrix, is welded along a mantle line of the jacket. This process offers economic advantages and also provides the required press fit.

A further aspect of the invention relates to manufacture of a cartridge with an oval or elliptical cross section. For this purpose, the supporting matrix is initially wound spirally into a circularly cylindrical body and subsequently pressed or flattened to a shape with an oval or elliptical cross section configuration by two tools bearing shell-like oval or elliptical forms. The circumference of the circularly cylindrical support matrix is dimensioned so that it completely fills the enclosed space formed by the two tools in the closed state.

A still further aspect of the invention relates to a process for manufacturing the cartridge of the invention with an oval cross section, wherein the jacket is formed from two half shells which are welded together. This process has the advantage that the finished cartridge, i.e., the supporting matrix secured to the jacket, may be produced at a single tool or at a single work station.

In another aspect of the invention, only the supporting matrix is initially deformed to an oval cross section in a press and then removed from the press for the subsequent processing steps of welding or brazing. Clamps are used to maintain the oval cross-sectional shape of the supporting matrix until the shape is made permanent by welding or brazing the end faces.

A further aspect of the invention relates to apparatus for carrying out the foregoing processes. The external diameter of the circularly cylindrical supporting matrix is thereby chosen such that the circumference of the oval cylindrical supporting matrix corresponds to the circumference of the tool dies or jacket half shells, i.e., is in contact all around. Further, the circularly cylindrical supporting matrix has an internal circularly cylindrical hollow space, half the circumference of which is equal to the length of the straight segment of the oval die. This arrangement has the advantage that the supporting matrix for an oval cartridge may first be wound spiraly into a circularly cylindrical body which is substantially simpler from a production standpoint than the winding of an oval cylindrical body. Because of the aforementioned coordination of the dimensions of the supporting matrix and of the tool dies, the subsequent deformation of the circular cylindrical body into an oval cylindrical configuration does not affect the honeycomb cellular structure of the supporting matrix.

BRIEF DESCRIPTION OF THE DRAWINGS

The invention will be further described with reference to the accompanying drawings wherein:

FIG. 1 is a side elevational view of the cartridge of the invention in partial longitudinal section;

FIG. 1a is a front elevation of the cartridge of the invention;

FIG. 1b is another front elevation of the cartridge of the invention with a modified oval cross section;

FIG. 1c is an enlarged sectional view of a portion of the end face of the cartridge of the invention;

FIG. 2 is a side elevational view in partial longitudinal section of the cartridge of the invention with an annular gap;

FIG. 5 is a representation of the drawing process of the invention;

FIG. 6 is a representation of an alternate jacketing process according to the invention;

DETAILED DESCRIPTION OF ILLUSTRATIVE PREFERRED EMBODIMENTS

Figure 3:
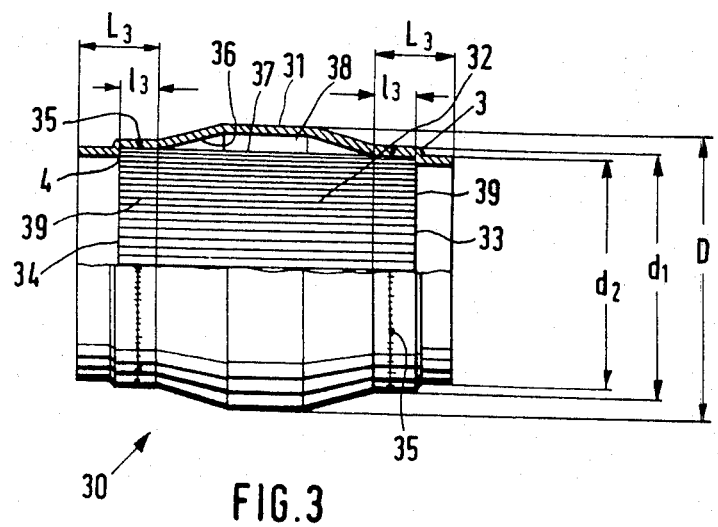
FIG. 3 is a side elevational view in partial longitudinal section of the cartridge of the invention with an annular space and a jacket constricted at the ends.

FIG. 1 shows a cartridge 10 comprising a catalyst support matrix 12 and a jacket 11 surrounding the support matrix. In order to axially immobilize the support matrix 12, jacket 11 is secured thereto by a plurality of weld bead segments 15, which preferably are produced by electron beam welding. Support matrix 12 preferably comprises spirally wound, alternately disposed, smooth and corrugated pieces of sheet metal. In this embodiment, the jacket 11 rests with its entire innner surface 16 in the manner of a press fit on the entire outer surface 17 of the supporting matrix. As described hereinbelow in detail, the press fit is produced by the contraction of the jacket 11 from its original diameter D to the diameter $d_1$.

FIG. 1a is a view of the end face 14 of cartridge 10, whereby the jacket 11 has a circular cross-section.

FIG. 1b shows a modification of the cartridge 10 to a cartridge 10' with the jacket 11' and the support matrix end face 14' having an elliptical cross section.

FIG. 1c is an enlarged representation of the end face 14 from FIG. 1a. The dark points 15' at the connecting points of the metal foils represent spot welds solidly joining the corrugated and smooth metal foils of the support matrix together, thereby preventing axial displacement of the foils. This welding of the end face applies equally to the other end face 13 and similarly to an oval or elliptical cross section. The welding of the end face by means of an electron beam may also be replaced by brazing the end face which produces an equivalent immobilization of the end face.

FIG. 2 shows a different configuration of cartridge 20 which also comprises a jacket 21 and a catalyst support matrix 22. The jacket 21 is contracted in the area of the lengths $L_2$ from its largest diameter D to a smaller diameter $d_1$, so that in the area of the surface strips 29 a press fit results between the jacket 21 and the outer surface 27 of support matrix 22. In the area of these surface strips 29 of width $l_2$, the jacket 21 is secured to the outer layers of support matrix 22 by a continuous or intermittent annular weld 25.

Between the surface strips 29 there is an annular space 28 between the outer surface 27 of support matrix 22 and the inner surface 26 of jacket 21 which, due to its air content, serves as insulation for the supporting matrix. On the one hand, it is necessary that the temperature of the support matrix 22 should not fall below a certain operating level, despite the strongly varying operational behavior of the automotive vehicle, in order to maintain or to increase the catalytic efficiency. On the other hand, in certain countries a maximum temperature is specified for parts located under a motor vehicle, including exhaust gas catalytic reactors comprising such a cartridge, to preclude a fire hazard with respect to the vehicle floor. These requirements are satisfied by the provision of the annular space 28.

FIG. 3 shows another embodiment in the form of a cartridge 30 with a jacket 31 having three different diameters, D, $d_1$ and $d_2$. In this embodiment, the diameter D of the tube for the jacket 31 is contracted to the diameter $d_1$ in the area of length $l_3$ in order to achieve a press fit for the surface strips 39. In the areas beyond the length $l_3$, the diameter is contracted to an even smaller diameter $d_2$, so that contact surfaces 3 and 4 are formed in front of the end faces 33 and 34 of support matrix 21, thereby effecting axial immobilization of the support matrix 32 in the jacket 31. Between the surface strips 39 there is an annular space 38 between the inner surface 36 of the jacket and the outer surface 37 of the support matrix for thermal insulation. In the areas of the surface strips 19, a press fit exists between the jacket 31 and the support matrix 32, so that a satisfactory welded joint may be established by means of an annular weld 35, produced preferably by electron beam welding.

Figure 4:
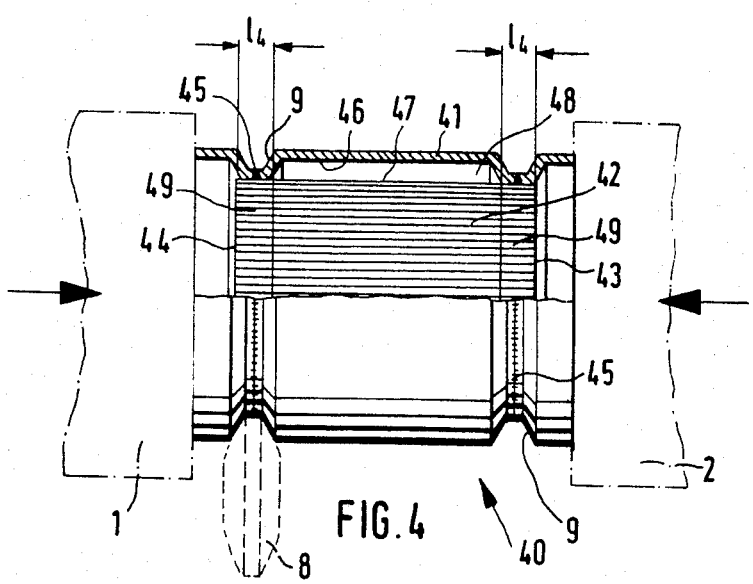
FIG. 4 is a side elevational view in partial longitudinal section of the cartridge of the invention with annular grooves rolled in the jacket.

FIG. 4 shows another embodiment of the invention comprising a cartridge 40 having a jacket 41 provided with circumferential annular grooves 9 to achieve the required press fit in the area of the surface strips 49. Annular grooves 9 preferably are rolled or milled into the smooth tube by a plurality of rolls 8 arranged around the circumference of the tube. Support matrix 42 is then inserted with radial clearance in jacket 41 and positioned with respect to its end faces 43 and 44, whereupon the jacket 41 is compressed axially by tools 1 and 2, so that the internal diameter of the annular grooves 9 is reduced and a press fit is achieved in the area of the surface strips 49. In the area of the annular groove 9, an annular weld 45 may then be applied to immobilize support matrix 42 in jacket 41.

FIG. 5 is a representation of a process for drawing down a jacket 51 to produce a cartridge 50 according to the invention. In the illustrated process, the spirally wound support matrix 52 is first introduced with radial clearance in a jacket 51 having a diameter D and positioned as desired. Subsequently, the two parts 51 and 52 are received by a holding die 6, which with its collar 7, supports the end face 53 of support matrix 52 and with its somewhat larger collar 8 supports the end of jacket 51. The draw die 5 having an internal diameter $d_1$, corresponding to the desired finished outside diameter or jacket 51 is drawn over jacket 51, so that the desired reduction in diameter and thereby the required press fit are achieved. This drawing process may be repeated with different draw dies of varying diameters, or it may be effected with a single draw die having a plurality of stepped diameters, so that the jacket 51 will also have a stepped diameter arrangement, such as illustrated in FIG. 3.

FIGS. 6, 6A and 6B show another process for manufacturing a finished cartridge 60 according to the invention. The jacket 61, clamped between the two pressing tools 63 and 64, is an open, hollow cylinder formed by rolling a flat, cut piece of sheet metal. The supporting matrix 62 is introduced into this slit cylinder with radial clearance between the outside of the matrix and the inside of the cylinder, and then the cylinder is placed between the two tools 63 and 64 and compressed so that in the area of the slit an overlap or a butt joint is obtained, depending on the dimensions and configuration of jacket 61. While still clamped between tools 63 and 64, the jacket is welded at the overlap or butt joint 65. The assembly may then be removed in the finished state from the tools 63 and 64, which move away from each other. The jacket 61 may be smooth so that the press fit extends over the entire length of the supporting matrix 62, or it may be provided with annular grooves 69, as shown in FIG. 4, which are rolled in during the rolling up of the flat sheet metal of the jacket. This process also results in an adequate press fit between the jacket 61 and the supporting matrix 62. Furthermore, this process is particularly economical because inexpensive, flat pieces of sheet metal are used as the starting material instead of seamless tubing.

Figures 7A, 7B:
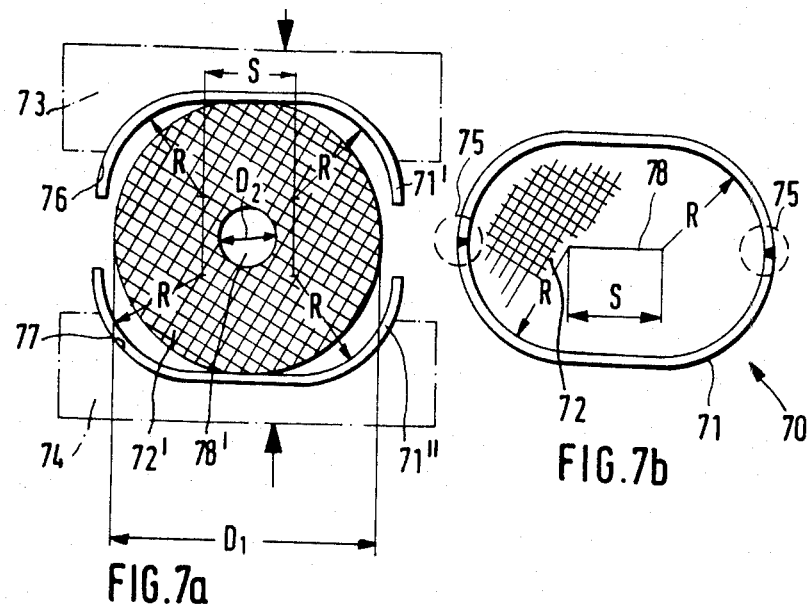
FIG. 7 is a representation of a process for manufacturing a cartridge having an oval cross section.

FIGS. 7A and 7B show a process for manufacturing a cartridge 70 according to the invention having an oval cross section. Initially, the support matrix 72' is spirally wound in the shape of a circularly cylindrical body on a core with a diameter $D_2$, until the diameter $D_1$ has been attained. The semi-elliptical half shells 71' and 71'' are inserted and secured in the tools 73 and 74, which are in the open position. Then, the circular cylindrical support matrix 72' is placed in the lower half shell 71'' after the internal core has been removed so that a hollow cylindrical space with the diameter $D_2$ is obtained. The oval configuration of the half shells is defined by the circular quarter arcs identified in the drawing by their radii R and the straight segments having the length s. The tools 73 and 74, which receive the half shells 71' and 71'' in their analogous opposing cavities 76 and 77, are moved toward each other until the two half shells 71' and 71'' abut each other and can be immediately welded, or at least spot welded, together so that the support matrix cannot spring back into its circular shape. The diameters $D_1$ and $D_2$ of the support matrix are chosen so that the circumference of the matrix 72, which is formed into an oval configuration, contacts the inner surface of the oval jacket 71 on all sides. This may be attained by observing the following relationship: $D_1 = 2\pi R + 2s$. The following relationship must be observed for the winding core or the corresponding hollow space having the diameter $D_2$ and the corresponding oval section of length s: $\pi \cdot D_2 = 2s$. The finished cartridge 70 has continuous weld seams 75 at the joints of the jacket 71.

Figures 8A, 8B:
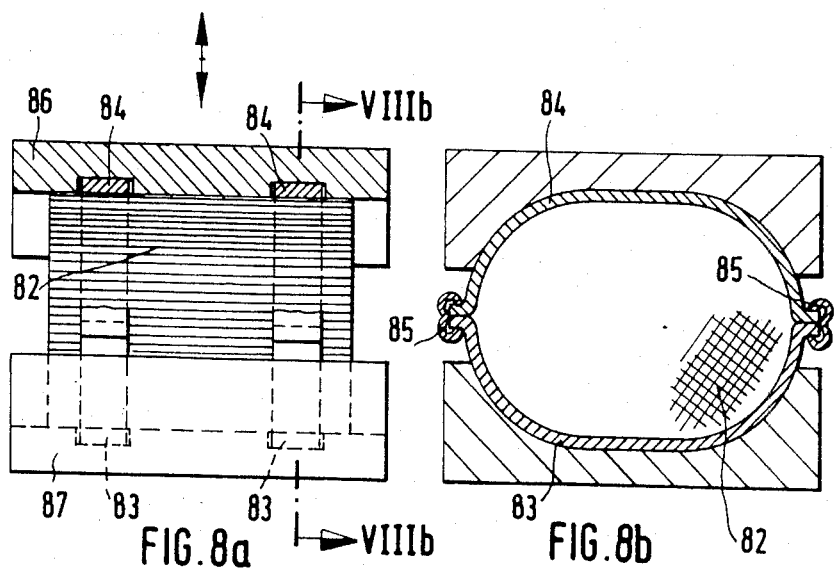
FIG. 8 is a representation of a process for manufacturing a support matrix having an oval cross section.

FIGS. 8A and 8B illustrate a further process for manufacturing a support matrix with an oval cross section, together with suitable devices for carrying out the process. According to this process, the supporting matrix 82, which is first wound spirally into a circular cylinder, is pressed into an oval configuration in suitable tools 86, 87. Retaining or holding clamps 83 and 84 are inserted in the two tools with the inner surfaces of the clamps flush with the semi-elliptical internal surfaces of the tool dies, so that a smoothly formed surface is obtained for the support matrix 82. When the two tools 86 and 87 are moved together, the holding clamps 83 and 84 are secured by means of a rapid closure 85 or some other suitable connector, so that the support matrix 82 may be removed from the tools 86 and 87 after they have been moved apart. Clamps which enter into a releasable connection with each other upon mutual impact may be used. Clamps 83 and 84 prevent the support matrix 82 from springing back into its previous shape, and the end faces of the support matrix may be welded or brazed, whereby the oval cross-sectional configuration is made permanent. The jacket (not shown in this figure) may then be pushed over the supporting matrix 82.

The foregoing embodiments have been described merely as examples of the invention and are not intended to be limiting. Since modifications of the disclosed embodiments within the scope and spirit of the invention may occur to persons skilled in the art, the scope of the invention is to be limited solely by the scope of the following claims.

What is claimed is:

1. A method for manufacturing a cartridge for purifying exhaust gases, comprising a catalyst support matrix wound metal foil and a metal jacket housing said support matrix, wherein an area of press fit is formed between the exterior of the support matrix and the interior of the jacket, with the jacket directly contacting the support matrix, and wherein the support matrix and jacket are secured together in the area of the press fit, said method comprising the steps of:

providing a hollow metal jacket;

inserting the wound support matrix into the jacket with a radial clearance between the matrix and the jacket;

thereafter reducing the diameter of at least a portion of the jacket and until an area of press fit is established between an outer surface of the support matrix and an inner surface of the jacket; and securing the support matrix and the jacket to each other by welding in the area of said press fit.

2. A method as defined in claim 1, wherein said metal jacket comprises a seamless metal tube, and said reducing step comprises drawing the jacket through a reducing die.

3. A method as defined in claim 2, wherein the area of press fit extends over only a portion of the length of the jacket.

4. A method as defined in claim 3, wherein an area of press fit is located along an annular strip at each end of the jacket, and between said strips an annular space is formed between the interior surface of the jacket and the exterior of the support matrix.

5. A method as defined in claim 1, wherein said metal jacket comprises a seamless metal tube, and said reducing step comprises forming at least two annular grooves in the jacket between each end wall of the support matrix and reducing the internal diameter of the annular grooves by axially compressing the jacket until the grooves contact the exterior of the support matrix to establish a press fit between the jacket grooves and the support matrix.

6. A method as defined in claim 5, wherein an area of press fit is located along an annular strip at each end of the jacket, and between said strips an annular space is formed between the interior surface of the jacket and the exterior of the support matrix.

7. A method as defined in claim 1, wherein said step of providing said jacket comprises forming the jacket by rolling a flat, precut piece of sheet metal having two longitudinal cut edges into an open-ended hollow cylinder, said reducing step comprises compressing the rolled cylinder between a pair of opposed, shell-like tools to reduce the circumference of the cylinder until a press fit is established between the interior surface of the jacket and the exterior of the support matrix, and wherein the method further comprises the step of permanently securing at least one of the cut edges of the cylindrical body.

8. A method as defined in claim 7, wherein an overlapping joint is formed along a mantle line of the hollow cylindrical jacket and one of the cut edges of the cylinder is permanently secured by welding the overlapping joint.

9. A method as defined in claim 7, wherein a butt joint is formed along a mantle line of the hollow cylinder and the cut edges of the cylinder are permanently secured by welding the butt joint.

10. A method as defined in claim 7, wherein an area of press fit is located along an annular strip at each end of the jacket, and between said strips an annular space is formed between the interior surface of the jacket and the exterior of the support matrix.

11. A method as defined in claim 1, wherein said welding comprises electron beam spot welding.

12. A method for manufacturing a cartridge for purifying exhaust gases, comprising a catalyst support matrix wound metal foil and a metal jacket housing said support matrix, wherein an area of press fit is formed between the exterior of the support matrix and the interior of the jacket, with the jacket directly contacting the support matrix, and wherein the support matrix and jacket are secured together in the area of the press fit, said method comprising the steps of:

providing a hollow metal jacket;

inserting the wound support matrix into the jacket with a radial clearance between the matrix and the jacket;

thereafter reducing the diameter of at least a portion of the jacket and until an area of press fit is established between an outer surface of the support matrix and an inner surface of the jacket; and securing the support matrix and the jacket to each other by brazing in the area of said press fit.

13. A method as defined in claim 12, wherein said metal jacket comprises a seamless metal tube, and said reducing step comprises drawing the jacket through a reducing die.

14. A method as defined in claim 13, wherein the area of press fit extends over only a portion of the length of the jacket.

15. A method as defined in claim 14, wherein an area of press fit is located along an annular strip at each end of the jacket, and between said strips an annular space is formed between the interior surface of the jacket and the exterior of the support matrix.

16. A method as defined in claim 12, wherein said metal jacket comprises a seamless metal tube, and said reducing step comprises forming at least two annular grooves in the jacket between each end wall of the support matrix and reducing the internal diameter of the annular grooves by axially compressing the jacket until the grooves contact the exterior of the support matrix to establish a press fit between the jacket grooves and the support matrix.

17. A method as defined in claim 16, wherein an area of press fit is located along an annular strip at each end of the jacket, and between said strips an annular space is formed between the interior surface of the jacket and the exterior of the support matrix.

18. A method as defined in claim 12, wherein said step of providing said jacket comprises forming the jacket by rolling a flat, precut piece of sheet metal having two longitudinal cut edges into an open-ended hollow cylinder, said reducing step comprises compressing the rolled cylinder between a pair of opposed, shell-like tools to reduce the circumference of the cylinder until a press fit is established between the interior surface of the jacket and the exterior of the support matrix, and wherein the method further comprises the step of permanently securing at least one of the cut edges of the cylindrical body.

19. A method as defined in claim 18, wherein an overlapping joint is formed along a mantle line of the hollow cylindrical jacket and one of the cut edges of the cylinder is permanently secured by welding the overlapping joint.

20. A method as defined in claim 18, wherein a butt joint is formed along a mantle line of the hollow cylinder and the cut edges of the cylinder are permanently secured by welding the butt joint.

21. A method as defined in claim 18, wherein an area of press fit is located along an annular strip at each end of the jacket, and between said strips an annular space is formed between the interior surface of the jacket and the exterior of the support matrix.

* * * * *